United States Patent [19]
Sarcia

[11] 3,840,420
[45] Oct. 8, 1974

[54] LAMINATING APPARATUS

[75] Inventor: Domenico S. Sarcia, Saugus, Mass.

[73] Assignee: Seal, Inc., Derby, Conn.

[22] Filed: May 31, 1972

[21] Appl. No.: 258,432

[52] U.S. Cl................. 156/358, 156/359, 156/583, 100/93 RP
[51] Int. Cl........................................... B30b 15/34
[58] Field of Search .......... 156/358, 363, 555, 580, 156/583, 228; 100/47, 49, 93 RP, 155, 168, 176

[56] References Cited
UNITED STATES PATENTS

| | | | |
|---|---|---|---|
| 2,680,468 | 6/1954 | Lewis | 156/583 |
| 2,877,586 | 3/1959 | Chenery et al. | 156/358 |
| 3,138,695 | 6/1964 | Bracich | 100/176 |
| 3,262,054 | 7/1966 | Lefkowitz | 100/47 |
| 3,404,057 | 10/1968 | Heiart | 156/583 |
| 3,421,966 | 1/1969 | McLaughlin | 156/555 |
| 3,453,169 | 7/1969 | Buck et al. | 156/555 |
| 3,737,359 | 6/1973 | Levitan | 156/583 |
| 3,738,897 | 6/1973 | Bianchini | 156/583 |

Primary Examiner—Charles E. Van Horn
Assistant Examiner—Basil J. Lewris
Attorney, Agent, or Firm—Schiller & Pandiscio

[57] ABSTRACT

A workpiece, comprising at least a rigid backing sheet, a transparent cover sheet, and a flat thin object (a photograph, art work or the like) between them, is laminated by being pressed between two pairs of rollers, one of the rollers being heated. Each pair of rollers is mounted as a discrete assembly, and the assemblies are pressed together by biasing means. Detent means are provided to separate the assemblies (at least the heated roller from the adjacent roller of the other assembly) in the absence of a workpiece, and control means responsive to entry of a workpiece automatically disengages the detent means to enable the assemblies to be pressed together, and re-engages the detent means upon exit of the workpiece. The control means comprises a clutching system in which a coil spring is utilized to clutch a driven gear and the detent means so as to effect engagement and disengagement of the detent means.

2 Claims, 8 Drawing Figures

LAMINATING APPARATUS

FIELD OF THE INVENTION

This invention relates to laminating.

BACKGROUND OF THE INVENTION

The uses for laminated materials are many, ranging from encasing photographs, printed material, or other degradable objects in transparent envelopes, to highlighting art works by laminating over them, transparent sheets which enrich the colors of the art works, to producing composite laminated sheets in which laminated layers cooperate to supply desired characteristics, e.g. a strength-providing layer to which is laminated one or more color-providing layers. For many of these uses, particularly encasing or covering pre-formed objects such as photographs, art works, etc., there has been a demand, heretofore unfilled, for a simple and inexpensive heat-pressure laminating device for rapidly and consistently providing such laminates. Prior machines typically have employed cumbersome and expensive heated platen assemblies to heat press materials therebetween.

SUMMARY OF THE INVENTION

It is an object of this invention to provide an inexpensive and reliable laminating apparatus and method.

Another object is to provide a relatively small, simple, portable and automatic laminating apparatus for encasing photographs, printed materials, art works and the like beneath protective transparent sheets.

Another object is to provide a novel laminating apparatus that comprises a novel heated roller and is adapted to effect dry mounting and laminating of a flat object such as a photograph.

The invention features a pressing apparatus, in particular a laminating apparatus, for laminating a workpiece, the apparatus comprising first and second laminating assemblies, the assemblies being arranged to press upon opposite sides of the workpiece. Biasing means bias the assemblies toward one another and a releasable detent means opposes this biasing to maintain the assemblies at least partially separated in the absence of a workpiece. Control means responsive to entry into the apparatus of a workpiece to be laminated automatically causes the detent means to release the assemblies so that they will press the workpiece and, in response to passage of the workpiece out of the apparatus, automatically causes the detent means to again at least partially separate the two assemblies.

In preferred embodiments, the assemblies consist of parallel rollers, having resilient exterior surfaces, arranged transverse to the direction of travel of the workpiece through the apparatus. The initially workpiece-contacted roller of the first assembly houses a heater. The detent means consists of a cam and cam follower arrangement, the cam being rotable by operation of the control means to lift the cam follower, and with it the first assembly, notwithstanding the force exerted by the biasing means. The cam is coaxially mounted with a driven gear, and clutch means are provided between the gear member and the cam. The clutch means comprise a helically wound spring having a free end which, when left free, permits the spring to clutch the gear member and cam for common rotation, plus a restraining member which is positioned to engage the free end of the spring and thereby disengage the gear member and the cam. This restraining member is rotatable into and out of spring-engaging position by the control means, in particular by mounting the restraining member on a control shaft which also mounts a lever in the form of a finger which is tripped by contact with an incoming workpiece to rotate the control shaft and hence the restraining member, thereby disengaging the spring and engaging the cam and gear member for common rotation. Passage of a workpiece past the lever causes the lever to return to its original position, therefore, also rotating the shaft back.

A preferred workpiece has a substrate and a transparent laminating sheet joined along one edge, that edge to be the first edge entering the machine. The object to be laminated is placed between the substrate and the transparent sheet so that the transparent sheet overlaps all edges of the object. A resilient scraper mounted near the entrance to the apparatus bears upon and smooths the workpiece before it reaches the heated roller.

DESCRIPTION OF THE PREFERRED EMBODIMENT

Other objects, features and advantages will be apparent to one skilled in the art from the following description of a preferred embodiment of the invention, taken together with the attached drawings thereof, wherein.

Figure 1:
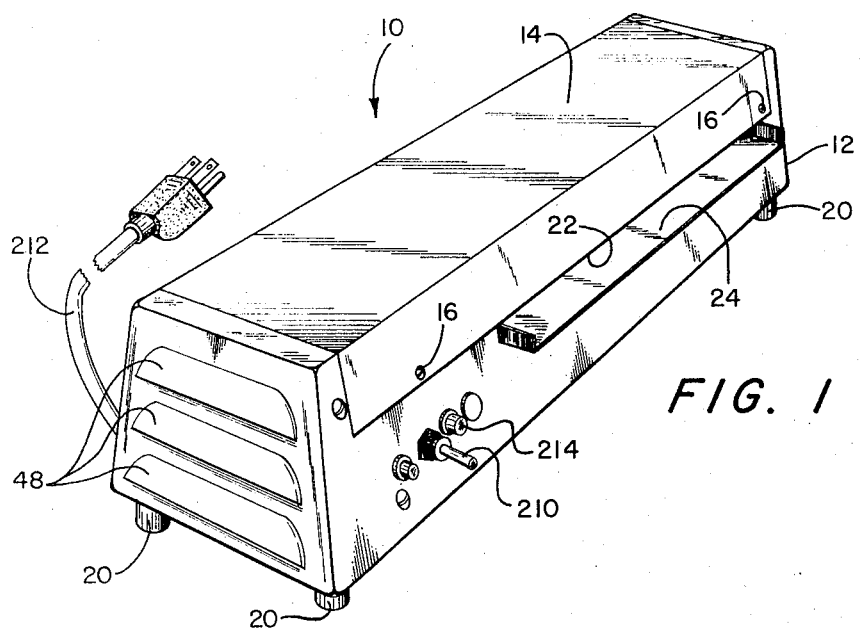
FIG. 1 is a perspective view of a laminating apparatus embodying the present invention.
Figure 2:
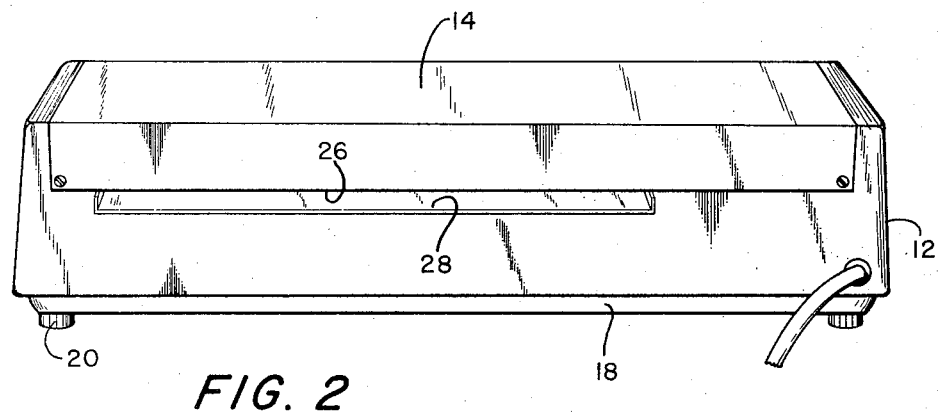
FIG. 2 is a rear perspective view of this apparatus.

The figures show a laminating apparatus 10 comprising a housing 12 having a removeable cover 14 fastened by four fasteners 16 (of which only two are shown). As is apparent in FIGS. 5-7, housing 12 rests on and is secured to a pedestal 18, which in turn has secured to its lower side four leveling screws or feet 20. Housing 12 has an elongated slot 22 on its forward side (FIG. 1) for receiving an entrace guide tray 24 and an elongated slot 26 on its rearward side (FIG. 2) for receiving an exit guide tray 28. Trays 24 and 26 are fastened as shown at 29 (FIG. 7) to the side plates 30 and 32 hereinafter described.

Figure 7:
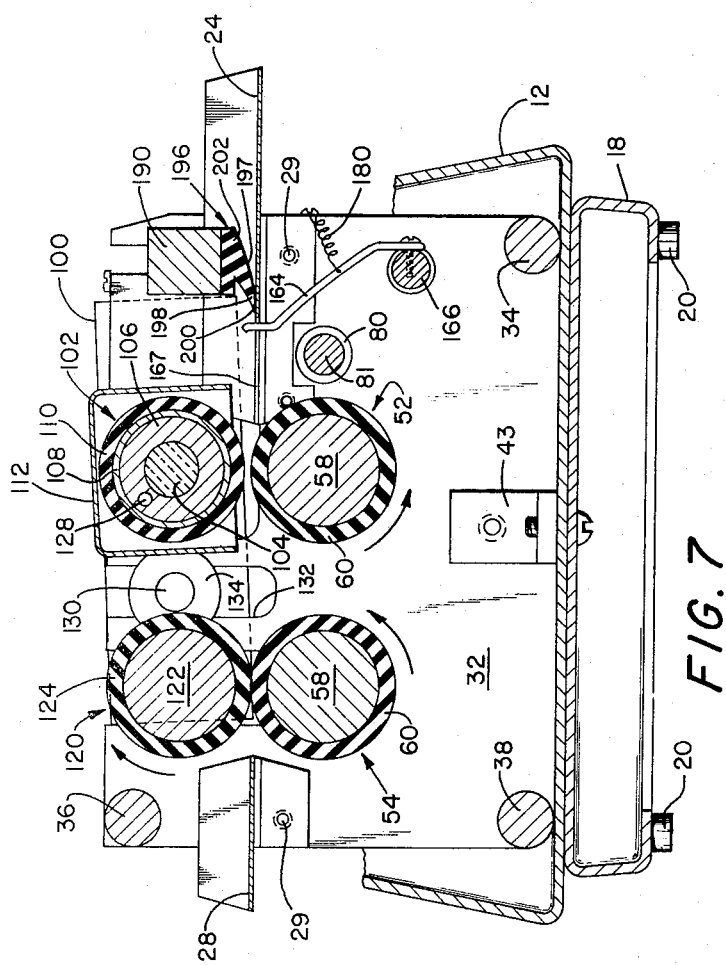
FIG. 7 is a sectional view of the apparatus, looking in the same direction as FIG. 5, substantially along the line 7-7 of FIG. 4.

Mounted within housing 12 is a frame assembly consisting of a first end plate 30 and a second end plate 32 which are connected together by three tie rods 34, 36, and 38 that are fastened at each end to plates 30 and 32 by screws 40. Plates 30 and 32 are anchored to the base of housing 12 by brackets 43, only one of which is shown (FIG. 7). A 115 volt, 60 cycle AC motor 42 is secured by a mounting bracket 44 on housing 12 and by a mounting bracket 46 on end plate 30. Baffled air openings 48 are located in the wall of housing 12 adjacent a fan 50 that is coupled to and driven by motor 42.

Figure 5:
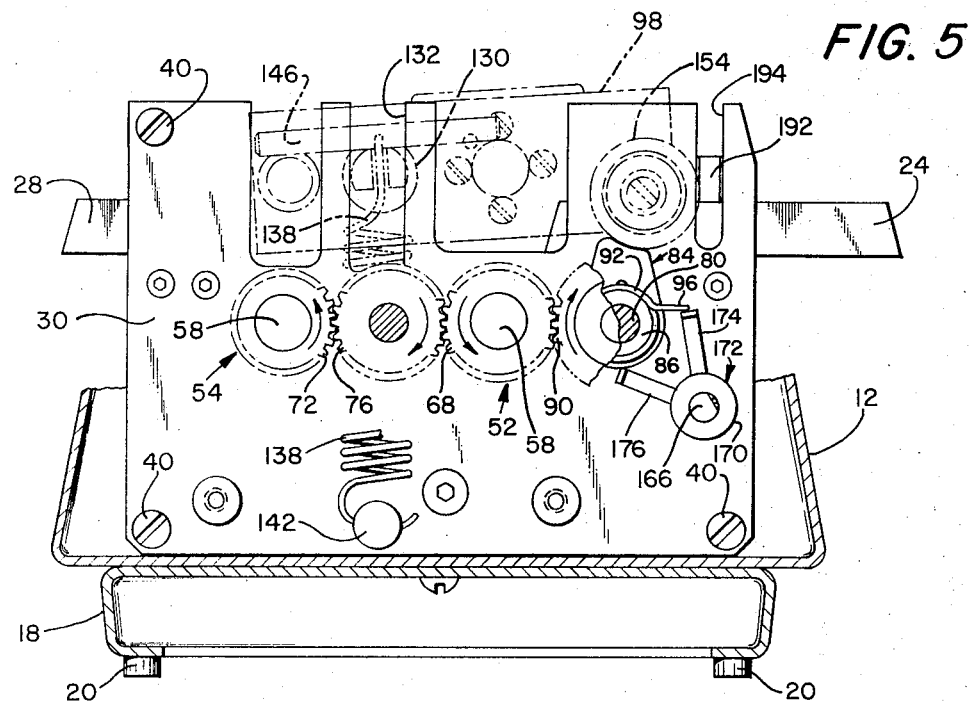
FIG. 5 is a side elevational view of the apparatus, with the housing broken away, and the top roller assembly shown in phantom.

Referring to FIGS. 5 and 7, the frame assembly supports the bottom roller assembly which comprises a forward roller 52 and a rearward bottom roller 54. Each bottom roller has an inner steel-nickel plate cylindrical core 58 supporting an exterior neoprene shell 60. Cores 58 of rollers 52 and 54 are formed with reduced diameter ends. One such end of each roller is journalled in bearings 64 mounted in end plate 32. The opposite ends are similarly journalled in end plate 30. However, these latter ends extend through plate 30 far enough to accommodate gears 68 and 72. Gears 68 and 72 are affixed to and rotatable with rollers 52 and 54 respectively.

Motor 42 has a drive shaft 74 which carries a drive gear 76, the latter being located between and meshing with gears 68 and 72 so as to drive those gears and hence lower rollers 52 and 54 simultaneously in the same direction as shown in FIG. 5.

Figure 4:
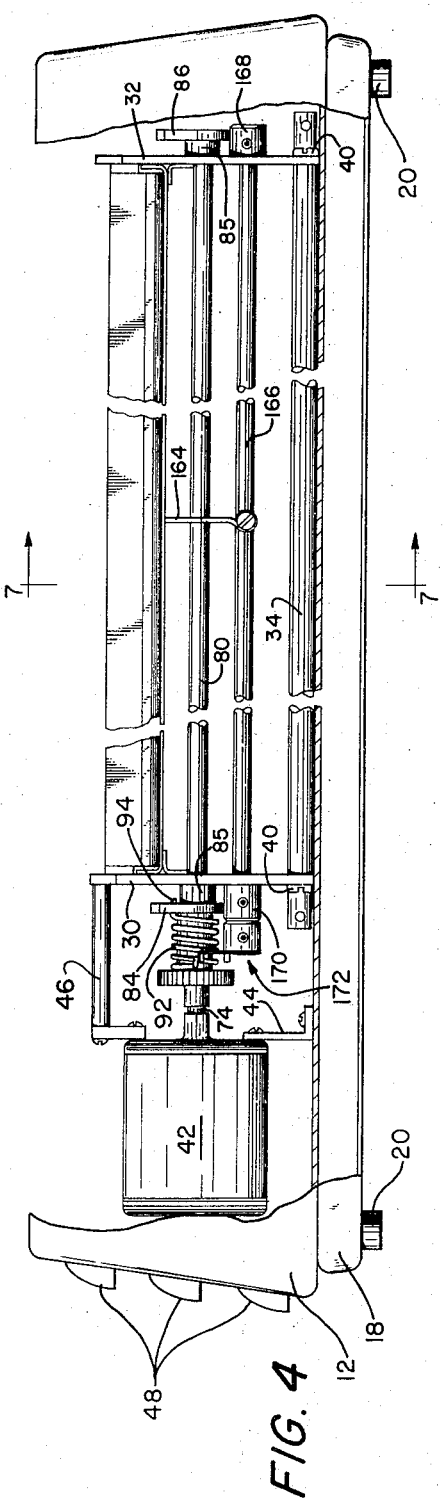
FIG. 4 is a front view of the apparatus, with the housing broken away, and the top roller assembly removed.

A cam shaft 80 (FIG. 4) also extends between and is journalled in end plates 30 and 32 by means of suitable bearings 81 (FIG. 7). Mounted on the ends of cam shaft 80 exterior of side plates 30 and 32 respectively are two identical cams 84 and 86. These cams have hubs 85 that are affixed to the cam shaft. As shown best in FIG. 6, the two cams have a smooth circular portion 87 and an eccentric or lobe portion 88 that has concave arcuate end edge 89. By way of example, the edge of portion 87 has a radius of 0.312 inch, the converging straight sides of lobe 88 taper toward one another at an angle of about 60°, and the end edge 89 has a radius of about 0.750 inch, with the opposite ends of edge 89 being about ½ and ⅝ inch from the axis of cam shaft 80. Rotatably mounted on one end of cam shaft 80 is cam shaft gear 90 which meshes with gear 68 of forward roller 52. A helically wound clutch spring 92 is wrapped around the hub of gear 90 and, as shown in FIG. 4, has an axial extension 94 at one end which is secured in a hole in cam 84. At the other end of clutch spring 92 is a radial L-shaped extension 96, the purpose of which will be explained hereinafter.

The upper roller assembly comprises a pair of side plates 98 and 100. A forward top roller 102, which is aligned with lower roller 52 as shown in FIG. 7, has an inner heating element 104, a stainless steel sleeve 106, and a thin brass sleeve 108, which is rotatable relative to sleeve 106 and provides good heat transfer to an outer silicon rubber shell 110. The latter is secured by a friction fit to sleeve 108 so as to rotate therewith on sleeve 106. A stainless steel heat shield 112 surrounds the top and sides of heated roller 102. Fasteners (not shown) are secured through the respective side plates 98 and 100, insulating fiberglass spacers 116 (FIG. 3) and the end walls 118 (FIG. 3) of heat shield 112 into stainless steel sleeve 106, to mount heated roller 102 between side plates 98 and 100.

The rearward top roller or idler roller 120, which is aligned with lower roller 54 as shown in FIG. 7, has a steel-nickel plate core 122 supporting a thick neoprene shell 124. Core 122 is journalled in side plates 98 and 100 to secure idler roller 120 rotatably between the side plates.

A thermostat 128 is contained in steel sleeve 106 of heated roller 102 to regulate the temperature of the roller.

Figure 3:
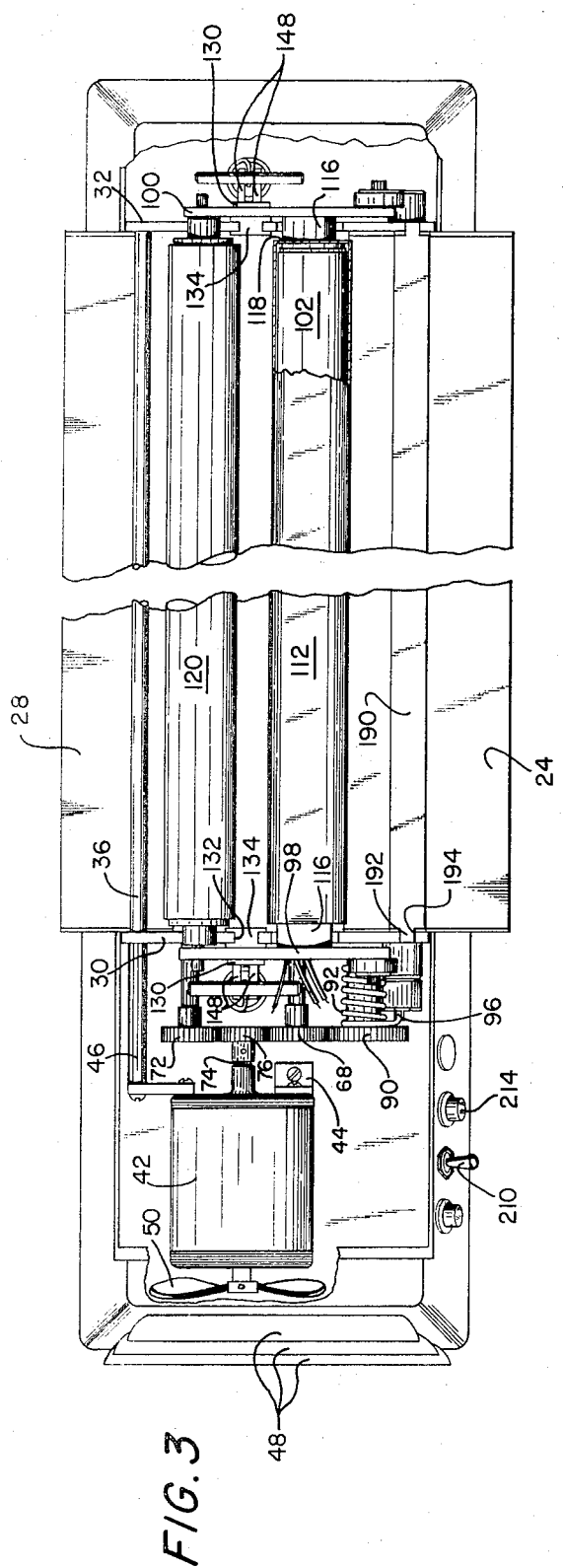
FIG. 3 is a top plan view of this apparatus, with the cover removed, and portions of the housing and of the heat shield for the heated roller broken away.

Like studs 130 (FIGS. 3, 5, 6 and 7) extend through and are affixed to the side plates 98 and 100. A circular wheel or bushing 134 is rotatably secured on an end of each stud 130. Bushings 134 are slidably mounted in vertical slots 132 in end plates 30 and 32, and for this function they have straight milled grooves at diametrically opposed sections thereof so as to slidably receive the edges of plates 30 and 32 that define the vertical sides of slots 132 (FIGS. 3 and 7). The studs 130 are bifurcated at the ends opposite bushings 134 so as to form a pair of lugs 148 that define a narrow channel 144 (FIGS. 5 and 6) and act as mounts for spring anchoring members 146. The latter are round rods and the upper sides of lugs 148 are grooved so as to provide seats for the anchoring members so that they will not slip off. Each anchoring member 146 is attached to one end of a hold-down spring member 138. The springs extend along the channels 144 and their lower ends are attached to lugs 142 affixed to end plates 30 and 32. The springs 138 act to urge the upper roller assembly down toward the lower roller assembly.

Also secured to the side plates 98 and 100 are rotatable cam followers 154 and 156 respectively, each of which has a smooth circular outer surface, which are engaged by the cams 84 and 86 respectively.

A tripping finger or lever 164 (FIGS. 4 and 7) is secured to a trip rod 166, which in turn is rotatably mounted in end plates 30 and 32. Finger 164 is made so that in one position it can extend up through a slot 167 in tray 24. One end of rod 166 projects beyond plate 30 and affixed thereto is a pawl 172 having a hub 170. The pawl has two L-shaped pawl arms 174 and 176, spaced 60° apart from one another. As shown in FIGS. 5 and 7, when the tip of tripping finger 164 extends through slot 167 above the level of entrance tray 24, biased to that position by a trip spring 180 that is connected to housing 12, trip rod 166 is in a position causing pawl arm 174 to engage the free radially extending end 96 of clutch spring 92.

At the entrance end to the apparatus, adjacent tray 24, is mounted a metal scraper support bar 190 which has a lug 192 at each end received in an appropriate notch 194 in end plates 30 and 32. Bar 190 is slidable vertically in notches 194. Secured to the lower surface of support bar 190 (e.g. by a suitable adhesive or cement) is a resilient silicon rubber scraper member 196. The latter has a tapered lower edge defined by front and rear surfaces 197 and 198 respectively that extend at a 45° angle with one another, with the front surface making an angle of about 30° with the upper surface of tray 24. The slots 194 allow the bar 190 to drop low enough for the lower edge of the scraper member to bear upon any entering workpiece.

Mounted on the exterior of housing 12 is an ON-OFF power switch 210 which energizes both motor 42 and the heating element 104 (whose exposed wires are shown in FIG. 3) through power cord 212 from a suitable power supply (not shown). A warning light 214 lights when switch 210 is on. Although not shown, it is to be understood that the thermostat is connected in series with the conductors of cord 212 and the heating element 204. The thermostat may be of the fixed or adjustable temperature type. The heater may be connected in series with a rheostat mounted to the housing 12 to regulate the rate at which power is delivered thereto. One or more suitable safety switches may be provided to shut down the apparatus in the event of overheating, motor failure or other malfunctions.

Figure 8:
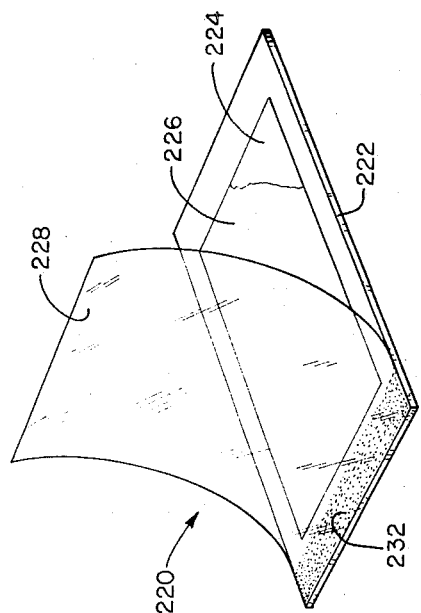
FIG. 8 is an axonometric view of a workpiece suitable for lamination in this apparatus.

An exemplary workpiece 220 to be laminated in the abovedescribed apparatus is shown in FIG. 8. This workpiece consists of a substrate or backing 222, usually of a relatively stiff material such as cardboard or fiberboard, a sheet of dry-mount tissue 224 (a paper tissue with a dry but thermally activatable adhesive coating on each side of the type conventionally used to mount photographs), a thin flat object 226 to be mounted (a photograph, for example) and a transparent plastic laminating cover sheet 228. By way of example, the latter may be a sheet of "Mylar" (sold by E. I. DuPont de Nemeurs Co.) with an adhesive on its inner surface in the form of polyethylene or other suitable material that softens and becomes tacky when subjected to heat.

Figure 6:
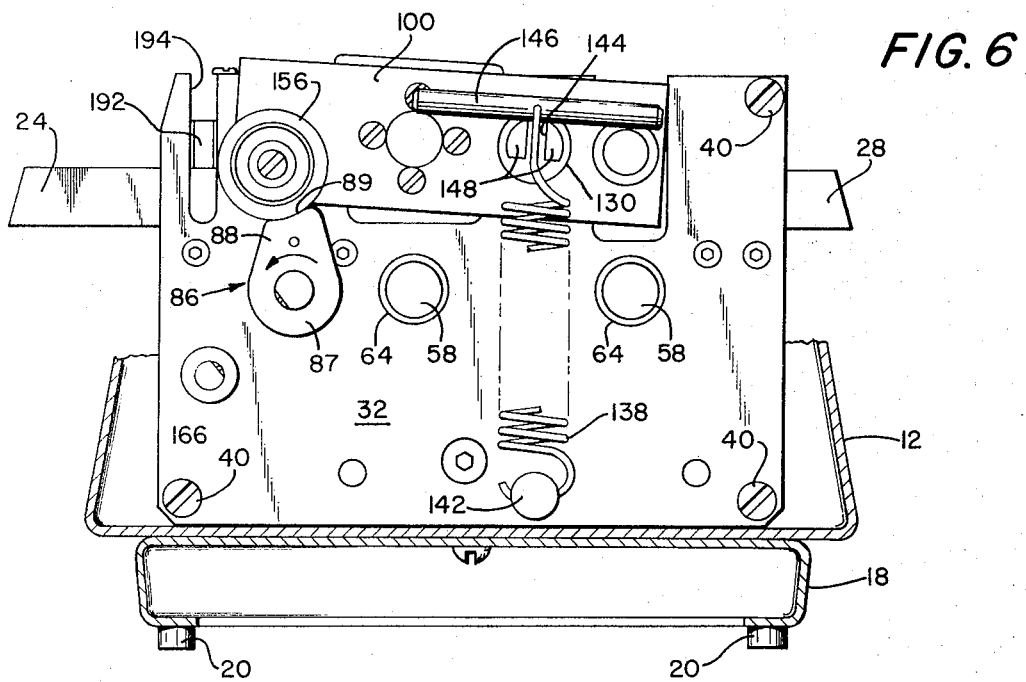
FIG. 6 is an elevational view of the side of the apparatus opposite to that shown in FIG. 5 with the housing broken away but the top roller assembly shown in full.

Operation of the apparatus will now be described. Assume that motor 42 is off and the cams 84 and 86 are positioned as shown in FIGS. 5 and 6 so that their lobes 88 are at approximately the 12 o'clock position and thus act on cam followers 154 and 156 to lock the upper roller assembly in raised position as shown. In this raised position, roller 120 engages roller 54 but heated roller 102 is spaced from roller 52. With the cams positioned as shown and with no workpiece pressing on finger 164, the pawl shaft 166 is positioned so that pawl finger 174 is engaged by the radial extension 96 of clutch spring 92. Assume now that switch 210 is turned on to energize motor 42 and heater 104. Operation of motor 42 will cause rollers 54 and 52 to rotate in the same direction (see arrows in FIG. 7) and roller 120 will be driven by roller 54. However, roller 102 will not rotate since it does not engage roller 52. Rotation of gear 68 will cause gear 90 to rotate, but cam shaft 80 will remain stationary. This is because pawl finger 174 tends to unwind the spring 92 so that gear 90 can slip relative thereto and rotate on cam shaft 80. Assume now that a laminating and dry-mounting operation is to be executed using the workpiece of FIG. 8. Workpiece 220 is placed on tray 24 with the bonded end of laminating film 228 in leading position. The workpiece is pushed forward into the machine under scraper 196 which smooths out the sheets of the workpiece so as to remove any wrinkles. As the workpiece 220 moves past scraper member 196, it engages and depresses finger 164, thus rotating rod 166 and hence also pawl 172 (counterclockwise as seen in FIGS. 5 and 7). The angle through which arm 174 rotates is sufficient to release the free end 96 of clutch spring 92, whereupon the spring tends to wind itself tight against and to clutch the hub of cam shaft gear 90, with the result that cam shaft 80 will start to rotate. Cam 84 will rotate clockwise as shown in FIG. 5, and cam 86 will rotate counterclockwise in the view shown in FIG. 6. As concave portions 89 of the lobes 88 of the cam move out from engagement with cam followers 154 and 156, the springs 138 will pull the upper roller assembly down, forcing roller 120 tighter against roller 54 and pressing roller 102 against roller 52. The length of the lobes 88 and the rate of rotation of cams 84 and 86 preferably are set so that the rollers 102 and 52 come into contact with each other just as the leading end of the workpiece enters the nip formed by said rollers.

The forward rollers now take over propelling workpiece 220 through the apparatus.

The pawl arm 176 is spaced about 60° from pawl arm 174 and its length is such that when the rod 166 is rotated under and to the limit determined by the action of the workpiece on finger 164, pawl arm 176 will intercept the moving radial extension 96 of the spring 92, with the result that the cam shaft will be unclutched from gear 90 and will stop rotating while the latter gear continues to rotate. Thus cams 84 and 86 rotate only far enough (about 60°) to lower the upper roller assembly into operating position. The cams will stay in this intermediate position so long as finger 164 is depressed by the workpiece.

The heated roller 102 activates the thermally activatable adhesive of dry mount tissue 224 so as to bond the object 226 to the backing 222, and also softens the thermoplastic coating on the inner surface of laminating film 228 sufficiently to bond to the upper surface of object 226 and also its margins to the backing 222.

When the rear edge of the workpiece 220 clears tripping finger 164, trip spring 180 causes finger 164 to return to the position shown in FIG. 7. As the finger returns, it causes trip rod 166 and pawl 172 to rotate back to their original positions. Pawl arm 176 will be swung out of engagement with the free end 96 of clutch spring 92. This action allows the spring 92 to again clutch the cam shaft, whereupon the cams 84 and 86 rotate (clockwise as seen in FIG. 5) about 270° back to their original position, thereby acting on cam followers 154 and 156 to raise heated roller 102 away from lower roller 52. As the cams reach their original 12 o'clock position, pawl arm 174 will once again engage the free end 96 of clutch spring 92, disengaging cam shaft gear 90 from the cam shaft. Thus the apparatus has cycled back to the position shown in FIGS. 5–7. The laminated product exits on tray 26.

The above-described apparatus has the advantages of light weight, small size, and simplicity of operation. It can also be readily disassembled simply by removing the cover 14 and unhooking springs 138 and 152, so that the entire top roller assembly can be lifted out (with appropriate disconnection of heater cords, etc.).

The cams and cam followers provide a smooth detent action, with substantially no noise being produced by the raising and lowering of the upper roller assembly. The relative rotation provided between the members 134 and the side bars 98 and 100 permits the upper rear roller to be maintained in engagement with the lower roller at all times while allowing the upper roller 102 to be moved easily into and out of engagement with roller 52. Separating rollers 102 and 52 avoids damage to the latter by overheating. The construction of roller 102 offers the advantages of reduced cost and a high rate of heat transfer due to the use of metal sleeve 108. A major advantage of the construction of roller 102 is that no slip rings are required to couple electrical power to heater 104 since the latter does not rotate.

The clutch mechanism is simple, durable and provides reliable operation. The floating scraper assures that the various sheets making up the workpiece are wrinkle-free before they pass between rolls 52 and 102. If desired, the gear train may be arranged so that roller 54 will rotate slightly faster than roller 52 to assure adequate tension on the sheets of the workpiece as the latter is being transported. The apparatus also lends itself to provision of separate switches for actuating the motor 42 and energizing the heater element 104. The heat shield 112 prevents accidental injury from contact with the roll 102 and also reduces heat loss. The bottom edges of the heat shield (see FIG. 7) terminate above the level of the bottom of roller 102 and thus the heat shield does not interfere with movement of the workpiece. The tray 24 supports the workpiece as it is being positioned and thus facilitates proper alignment of the workpiece so that it will not enter between the front rollers at an oblique angle.

It also is contemplated that other means may be used in place of the cam detent arrangement herein described to effect automatic and controlled raising and lowering of the upper roller assembly. It also is contemplated that the upper roller assembly may be adapted so that its rear roller also is raised out of engagement with the rear bottom roller; however, this adaptation is not advantageous unless one or the other of the rear rollers is heated.

It is to be noted that the heat shield or shroud 112 may also be made of aluminum or other metal. However, regardless of the material used, the inner and outer surfaces of the heat shield are highly polished so as to have a smooth mirror-like finish. The polished inner surfaces act to reflect heat back to the heated upper roller 102, while the polished outer surfaces cut down heat losses by radiation since a polished surface has a lower emissivity than a non-polished surface. Separating the rollers 102 and 52 until a workpiece has been inserted in the machine also serves to reduce heat loss.

The apparatus can be used for laminating or dry-mounting any flat objects, such as postcards and art works, as well as photographs. It is to be noted that by eliminating the dry-mount tissue from the workpiece of FIG. 8, it is possible to effect lamination of film 228 to both object 224 and substrate 222 so as to protectively encase the object. Various types of dry-mounting tissue and laminating films may be used with this apparatus, e.g. the MT-5 tissue and Sealamin laminating film sold by Seal, Inc. of Derby, Connecticut. The finished laminate is smooth, wrinkle-free and firmly bonded.

Because the upper roller assembly is moveable vertically with respect to the bottom rollers, the apparatus is adapted to dry-mount and/or laminate workpieces of different thicknesses. The action of spring 138 automatically compensates for thickness variations.

Other embodiments will occur to those skilled in the art and are within the following claims:

What is claimed is:

1. A laminating apparatus for laminating a workpiece comprising a first laminating assembly that includes a heated roller, a second laminating assembly, said assemblies being arranged to press upon opposite sides of said workpiece, biasing means for biasing said assemblies toward one another, detent means for overcoming said biasing means to maintain said first assembly separated from said second assembly at least in the region of said heated roller, said detent means comprising a cam follower connected to one of said laminating assemblies and a cooperating rotatable eccentric cam connected to the other of said laminating assemblies, said cam being rotatable to a first position for overcoming said biasing means and separating said assemblies and to a second position for enabling said biasing means to press said assemblies against one another, drive means, and control means for operating said detent means so that said laminating assemblies are pressed toward one another responsive to entry of a workpiece to be laminated into said apparatus and are separated from one another responsive to passage of said workpiece out of said apparatus, said control means comprising a gear mounted coaxially with said cam and driven by said drive means, clutch means for coupling said cam and said gear so as to rotate said cam between said first and said second position, and a lever; said clutch means comprising a helically wound spring arranged coaxially with and between said cam and said gear, said gear having a hub surrounded by said spring, said spring having one end secured to said cam and having a radially protruding free end, and a movable restraining member for selectively engaging said free end of said spring to prevent said spring from clutching said gear hub and for releasing said free end so that said spring clutches said gear hub to cause said gear and cam to rotate together, said restraining member comprising a pawl movably mounted on a pawl shaft, said pawl having first and second radially extending arms, said first arm arranged to engage said free end of said spring when said pawl is in a first position so as to prevent said spring from clutching said gear hub, and said second arm arranged to engage said free end of said spring when said pawl is in a second position so as to prevent said spring from clutching said gear hub, and further wherein said lever projects into the path of travel of said workpiece through said apparatus between the workpiece entrance to said apparatus and said heated roller, said lever being secured to said pawl shaft and being depressible by an incoming workpiece to rotate said pawl from said first to said second position so that said first pawl arm is disengaged from and said second pawl arm can intercept said free end of said spring.

2. A laminating apparatus according to claim 1 wherein said control means also includes lever biasing means for returning said lever to its said projecting position after passage of a workpiece, thereby to rotate said pawl back to said first position so that said second pawl arm is disengaged from said spring.

* * * * *